A. W. SLATER.
RAIL JOINT.
APPLICATION FILED MAY 13, 1913.
1,216,373. Patented Feb. 20, 1917.
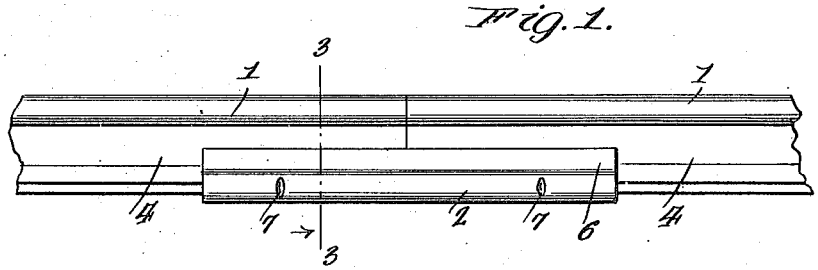
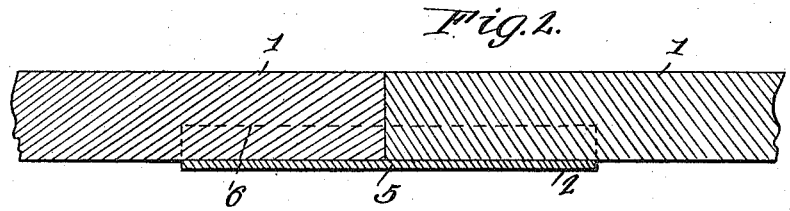
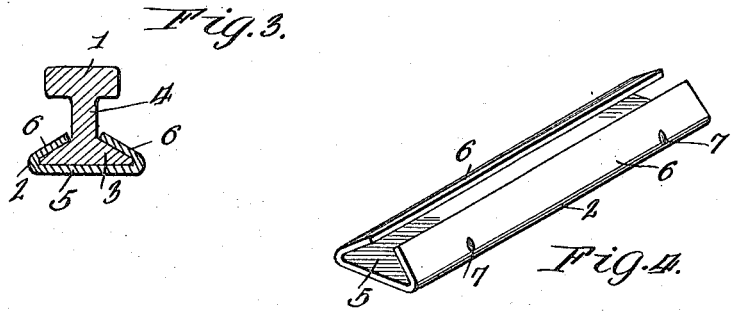
Witnesses
G. M. Spring
Inventor
Aldred W. Slater,
By
his Attorney

UNITED STATES PATENT OFFICE.

ALDRED W. SLATER, OF YOUNGSTOWN, OHIO.

RAIL-JOINT.

1,216,373.   Specification of Letters Patent.   Patented Feb. 20, 1917.

Application filed May 13, 1913.   Serial No. 767,473.

*To all whom it may concern:*

Be it known that I, ALDRED W. SLATER, a citizen of the United States, residing at Youngstown, in the county of Mahoning and State of Ohio, have invented certain new and useful Improvements in Rail-Joints, of which the following is a specification.

My invention relates to rail joints.
One object of the invention is to provide an improved and simplified construction of device of this kind which will effectually and positively connect or join rails without the use of bolts or other fastening means to engage the rail.

Another object of the invention is to provide a device of such construction that it may be stamped or formed from resilient sheet metal thereby being manufacturable at very low cost.

The preferred embodiment of the invention is described hereinafter in connection with drawings accompanying this application illustrating the preferred form.
In said drawings:—

Figure 1 is a side elevation showing rails joined by my improved device;

Fig. 2 is a vertical sectional view of the parts of Fig. 1;
Fig. 3 is a transverse sectional view on the line 3—3 of Fig. 1; and Fig. 4 is a perspective view of the rail joining member employed.

Throughout the drawings like reference characters designate like or similar parts.

Referring specifically to the drawings 1 designates rails which are joined or coupled by my improved joining device 2. The rails as usual are provided with the tread flange 3 extending on opposite sides of the web 4.

The joining member is best shown in Fig. 4 and comprises a seat or chair plate 5 having rising therefrom on opposite sides flanges 6.
In manufacturing the joining member the same can be made or stamped and formed from a sheet of yieldable metal, the flanges 6 being integral with the plate 5 and formed to tend to spring inwardly from said plate and arranged at an angle thereto.

One or more notches 7 may be provided on the flanges 6 in which may be received the heads of fastening spikes or the like adapted to be driven into the tie and serve to positively anchor the joining member, even should undue pressure be exerted, laterally or otherwise on the rails.

In use prior to coupling or joining rails 1, the joining member is slipped over the end of one of said members the bottom wall of the tread flange 3 resting or seating upon the plate 5 and the flanges 6 tightly and frictionally springing against the upper faces of the tread flange on opposite sides of the web 4. The joining member may be driven entirely in this way on to one of the rails, thereafter the other rail placed in elongation of the first rail and the joining member then driven so as to extend half or part way over the joint on each side thereof, thereby effectually coupling or joining the rails 1.

It is very advisable that the flanges 6 terminate short of the web 4 so that the full resiliency or spring action thereof will be exerted upon the upper walls of the base flange 3; which would not be the case if vertical extensions were provided on said flanges 6.

In order to permit the sliding movement particularly as just referred to, it is essential that the inner walls or faces of the flanges 6 be plain as shown in Fig. 3 as distinguished from a wall roughened or provided with teeth which would of course engage the rails and prevent the free sliding movement.

By reason of the fact that the joining member can thus slide, it forms a very desirable joint inasmuch as a rail can be readily removed at any time merely through the sliding of the joining member 2 which therefore would necessitate the removal of spikes only for one of the rails.

Changes such as fall within the spirit and scope of the appended claims are reserved inasmuch as the preferred form of the device only has been illustrated.

Having thus fully described my invention what I claim as new and desire to secure by Letters Patent is:—

1. A rail joint including rail ends having their terminals contacting, in combination with a joining member comprising a base rest adapted to receive the bases of the rail ends, resilient longitudinal portions integrally formed with the longitudinal edges of the base rest and curved to fit over the edges of the rail base and inclined upwardly to form angularly extending members resiliently engaged with the top surfaces of the rail base and having their free marginal edges disposed in close proximity to the point at which the web of the rail joins the base thereof thus preventing contact with the rail web or rail head whereby the resilient action will be exerted upon the rail base exclusively.

2. A rail joint including, in combination with a pair of rails, of an elongated metallic strip adapted to provide a base rest for the meeting ends of said rails, said strip having longitudinal portions thereof bent inwardly and upwardly to form angularly extending members, upon opposite sides of the rail web, said angularly extending members being inclined resiliently toward the base of the strip, said members being forced outward against their own resilient action by the base flange of said rail when said structure is inserted thereon, whereby they are adapted to be flexed into secure engagement with the upper faces of the base flange of said rails when inserted thereupon, said members terminating at the juncture of the rail web with said base flange to permit of full resilient action being exerted upon the upper surface of the base flange.

In testimony whereof I affix my signature in presence of two witnesses.

ALDRED W. SLATER.

Witnesses:
THERESA THOMPSON,
S. M. THOMPSON.